Feb. 17, 1970  G. L. BARBER  3,495,823
AMUSEMENT RIDE
Filed Jan. 23, 1968  5 Sheets-Sheet 1

INVENTOR.
GERALD L. BARBER
BY

Feb. 17, 1970     G. L. BARBER     3,495,823
AMUSEMENT RIDE
Filed Jan. 23, 1968     5 Sheets-Sheet 2

INVENTOR.
GERALD L. BARBER
BY

Feb. 17, 1970  G. L. BARBER  3,495,823
AMUSEMENT RIDE
Filed Jan. 23, 1968  5 Sheets-Sheet 3
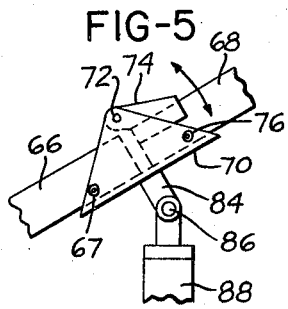
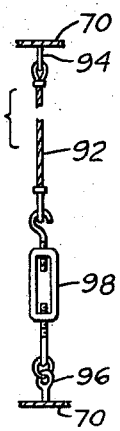
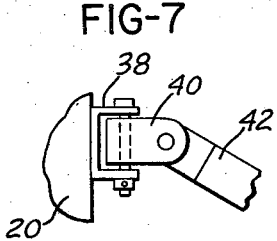
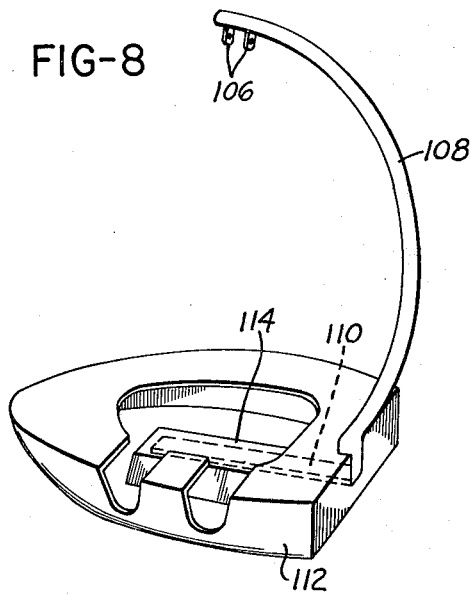
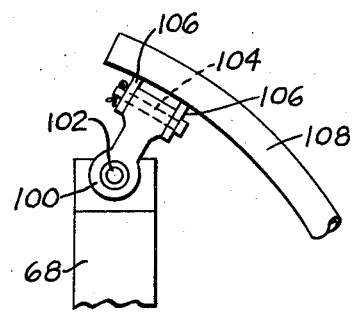
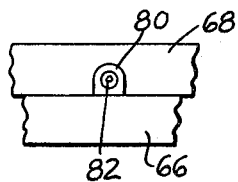
INVENTOR.
GERALD L. BARBER
BY Feb. 17, 1970

G. L. BARBER 3,495,823

AMUSEMENT RIDE

Filed Jan. 23, 1968

INVENTOR.
GERALD L. BARBER
BY

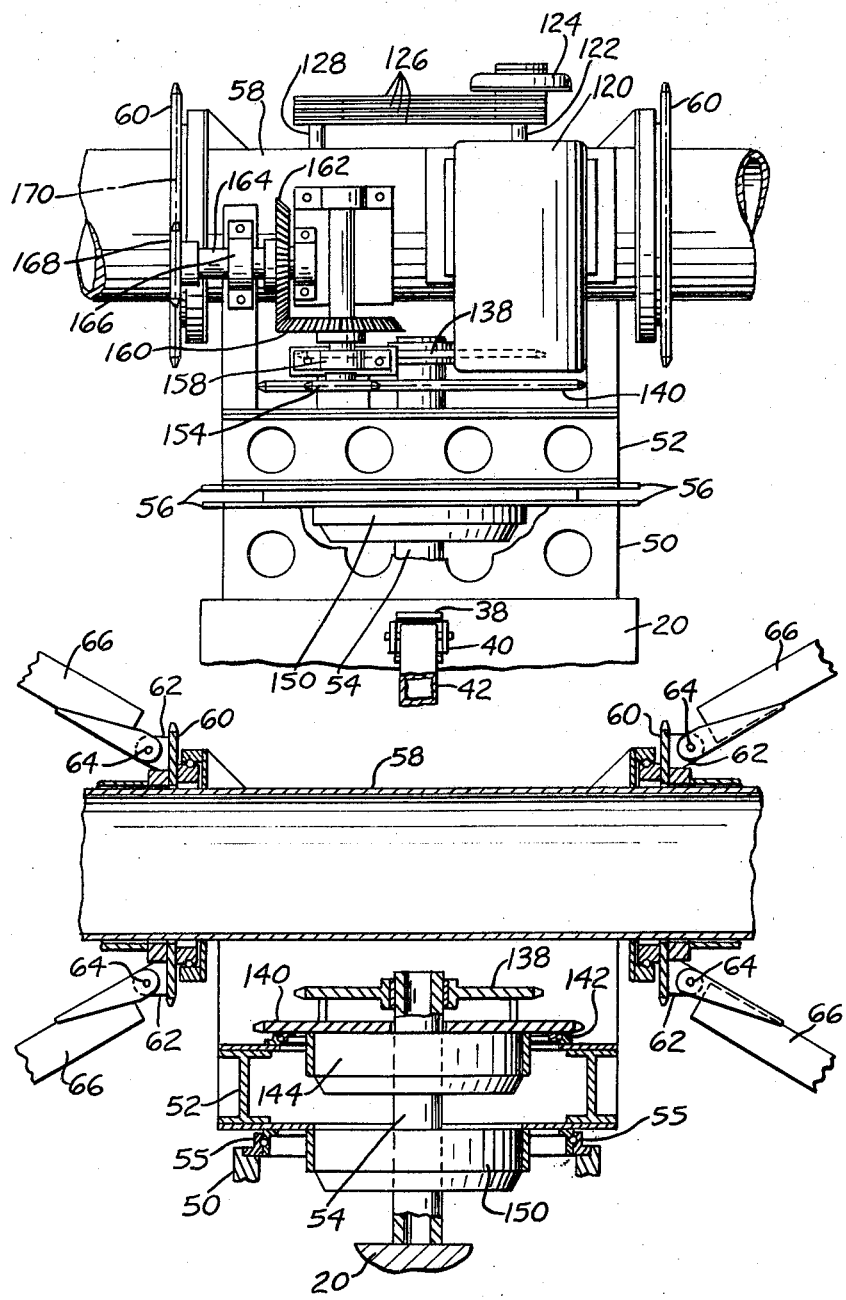

United States Patent Office 3,495,823
Patented Feb. 17, 1970

3,495,823
AMUSEMENT RIDE
Gerald L. Barber, 3707 Del Sienno,
Wichita, Kans. 67203
Filed Jan. 23, 1968, Ser. No. 699,938
Int. Cl. A63g 1/10, 1/00
U.S. Cl. 272—29                                    8 Claims

ABSTRACT OF THE DISCLOSURE

Amusement ride having spaced counter-rotating wheels having cabs suspended therefrom and with the wheels mounted for bodily rotation about a vertical axis. The wheel assemblies are collapsible and the ride is supported on the intermediate portion of a jointed trailer vehicle which forms the conveying means for the ride when the ride and trailer are collapsed and supports the ride in elevated position when the trailer is buckled to substantially an A shape with the intermediate portion at the top.

---

The present invention relates to an amusement ride of a novel type, and to a novel arrangement whereby the ride can be set up quickly and collapsed quickly and transported conveniently.

The amusement ride disclosed in the present invention is related to the amusement ride shown in my issued Patent No. 3,176,983, but represents significant advantages and improvements thereover. In the amusement ride of the present invention, two sets of support arms are provided which define a pair of cones with their apices facing each other so that the sets of arms define a pair of cone shape wheels with the outer ends of the arms spaced apart on the circumferences of a pair of laterally spaced vertically disposed circles.

Seats or the like are swingably supported on the ends of the arms and the said cone shaped wheels are arranged to rotate in respectively oposite directions on their axes while, simultaneously, the support for the cone shaped wheels is adapted to rotate on a vertical axis. The wheels, thus, bodily rotate about a vertical axis while rotating simultaneously on the common horizontal axis of the wheels.

Control means is provided for selectively stopping the rotation of the wheels about the vertical axis for the purpose of loading and unloading the wheels and during the loading and unloading of the wheels, they are caused to rotate on the aforementioned horizontal axis so that the seats thereof are, in turn, presented to a loading position.

With many rides of the nature referred to, it is important to be able to knock them down quickly and to set them up quickly and to transport them conveniently from place to place. The present invention is particularly concerned with the construction of a ride of the aforementioned nature such that collapsing thereof and erection thereof and transportation thereof is quite convenient.

Many times, in order to achieve the greatest convenience in the collapsing and erecting of an amusement ride, some sacrifice of structural strength or stability is necessary. The arrangement of the present invention, however, is particularly designed to provide an extremely strong stable structure for the ride whereby the utmost in safety and solidity is achieved while, at the same time, the ride can be set up and collapsed with great dispatch.

Still further, a particular feature of the present invention is the incorporation of the ride structure in a supporting vehicle of such nature that the vehicle itself forms the base for the ride when the ride is erected. Because of this feature, the structure of the amusement ride always remains on its vehicle and can, therefore, be erected and collapsed very quickly and without a laborious time consuming process of loading parts thereof on a conveying vehicle.

Other particular features and advantages of the present invention will become more apparent upon reference to the following detailed specification, taken in connection with the accompanying drawings wherein:

FIGURE 5 is a fragmentary view drawn at somewhat enlarged scale showing the construction of a joint used in the seat supporting arms to permit folding thereof;

FIGURE 6 is a schematic view showing a turnbuckle and cable connection which is employed between each adjacent pair of arms for the purpose of adding structural strength to the ride when erected;

FIGURE 7 is a fragmentary view drawn at somewhat enlarged scale showing a pivot for supporting brace posts that are employed to impart stability to the amusement ride when it is erected;

FIGURE 8 is a perspective view showing the arrangement of a typical seat for the ride;

FIGURE 9 is a fragmentary view showing how the two portions of the arms of the amusement ride are connected when in collapsed position;

FIGURE 10 is a fragmentary view drawn at enlarged scale showing how the seats of the amusement ride are swingably mounted on the outer ends of the support arms therefor;

FIGURE 13 is a view looking in at FIGURE 12 from the right side; and

FIGURE 14 is a view taken substantially on line XIV—XIV of FIGURE 11 showing details in connection with the construction of the ride of the present invention.

Figure 1:
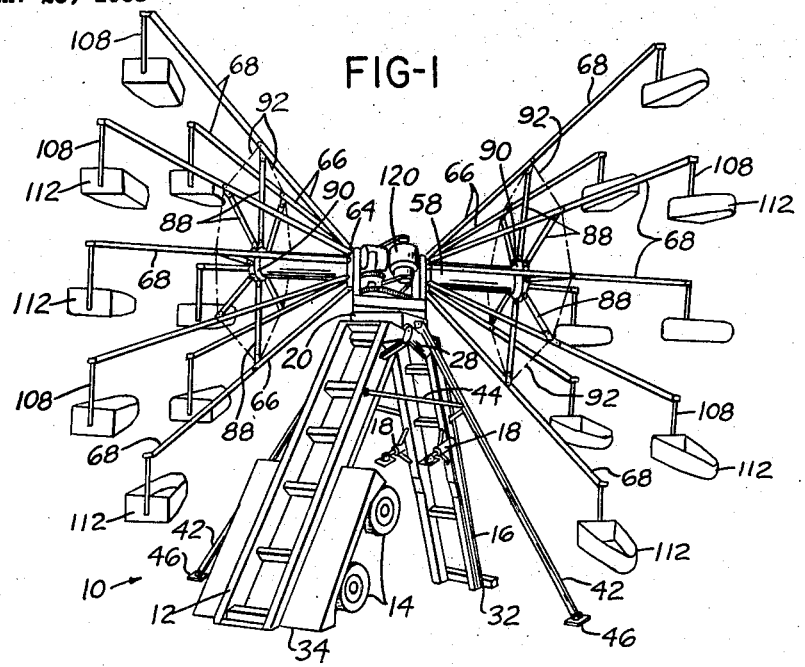
FIGURE 1 is a perspective view showing the amusement ride according to the invention as it appears when erected.

Referring to the drawings somewhat more in detail, FIGURES 1 to 4 will show that the ride according to the present invention is made up of a trailer type vehicle, generally indicated at 10, and comprising a rear portion or section 12 having tandem wheels 14, a front portion or section 16 having adjustable support means 18 thereon, and a relatively short central portion or section 20 pivoted to the front and rear sections on the pivot axes 22 and 24.

The exact manner in which the trailer vehicle is constructed, other than the features specific to the present invention, is not important and conventional practices can be observed in fabricating the trailer vehicle. For example, the front section could also have wheels, if desired. It is understood, of course, that the jointed construction of the vehicle is considered to be novel with the present invention.

Each of the front and rear portions of the vehicle have plate members 26 thereon adjacent the connections thereof with the center portion 20. Fluid motors 28 are connected between the front and rear sections near their pivotal connection with center section 20 and points on the plates 26 displaced downwardly from the aforementioned pivotal connection of the front and rear sections of the trailer with the center section thereof.

Figure 2:
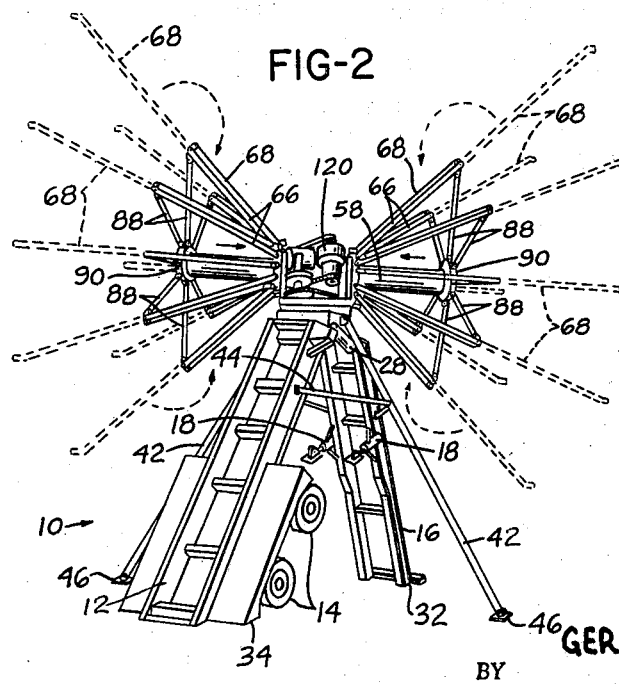
FIGURE 2 is a view similar to FIGURE 1 but shows the amusement ride partially collapsed.
Figure 3:
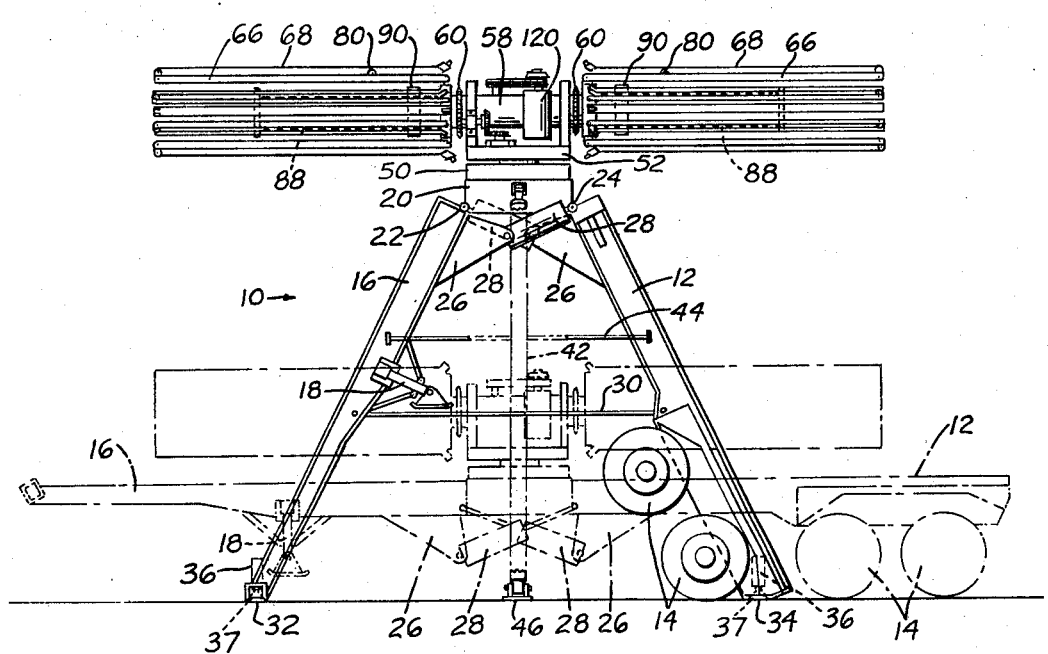
FIGURE 3 is a view showing the seat carrying arm portion of the amusement ride fully collapsed and showing the supporting vehicle for the amusement ride in elevated position in full lines and in lowered transporting position in dot-dash outline.
Figure 4:
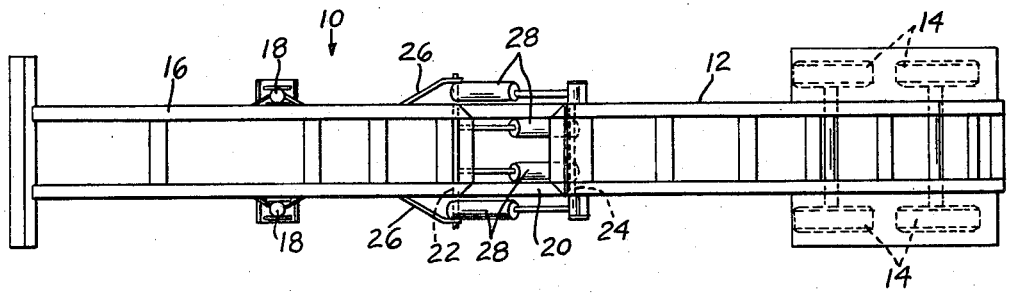
FIGURE 4 is a plan view looking down on top of the supporting vehicle or trailer structure with the other elements of the amusement ride according to the present invention removed therefrom.

As can best be seen in FIGURE 3, when the said motors 28 are extended, the front and rear sections 16 and 12 of the trailer together with the center section 20 form a substantially flat trailer bed. It will be seen that the front and rear sections and the center section of the trailer abut when the trailer is in its lowered position so that an extremely strong structure results. The portions can, of course, be bolted together in lowered position. Energization of the aforementioned fluid motors to draw the rods thereof inwardly will cause the trailer to buckle up toward its FIGURES 1, 2 and 3 position, the latter position being that shown in full lines in FIGURE 3, so that the center section 20 is elevated to the position illustrated in those figures.

When the center section of the trailer has been elevated to the point that the pistons in motors 28 bottom in the motor cylinder, the center portion 20 will be level and the trailer structure in its buckled position will be stable. It is advantageous, of course, to connect tie members, as schematically indicated at 30, between the front and rear portions so that the buckled trailer will be firmly held in its stable buckled position even in the absence of fluid pressure in motor 28.

Advantageously, both the front and rear extreme ends of the trailer structure, as indicated at 32 and 34, are so inclined that a relatively large bearing area is formed thereon for engagement with the ground or other supporting surface when the trailer is in its buckled position. Further, fluid motors 36 and foot members 37 pertaining thereto could be provided at the front and back ends of the trailer for enhancing the security of the engagement of the extreme ends of the trailer with the ground when the trailer is in buckled position. The wheels of the trailer, as will be seen, are lifted from the ground when the trailer is in buckled position.

The center section 20 of the trailer has a pivotal brace member supporting arrangement on each side thereof, one of which will best be seen in FIGURE 7. This pivotal supporting arrangement comprises the bracket member 38 fixed to portion 20, as by welding, and which supports a second bracket member 40 so that bracket member 40 can pivot on bracket member 38 about a vertical axis. Bracket member 40, in turn, defines a horizontal pivot axis on which the upper end of a brace member or support post or beam 42 is pivoted. The brace members or beams 42 will be seen in FIGURES 1, 2 and 3 where it will be noted that they provide lateral bracing for the trailer when in its buckled position. Advantageously, arms 44 are provided extending between the brace members 42 and the front and rear portions of the trailer to hold the brace members in the proper position.

By utilizing the pivotal connection toward the upper end of the brace members above described, it becomes possible, upon collapsing the device, merely to swing the brace members laterally so that they lie along the trailer and secure them in place whereupon the brace members can readily be transported with the remainder of the ride. The bracing arms 44, of course, have readily detachable connections at either one end or both ends thereof to facilitate the erection and collapsing of the trailer. Brace members 42 may advantageously have swivel feet 46 thereon and, furthermore, may be adjustable in length if so desired.

Mounted on top of center section 20 of the trailer and fixed thereto as by welding or bolts is an intermediate or spacer or base member 50 which provides the supporting base proper for the moveable portion of the ride. Spacer member 50 is box-like in configuration and disposed immediately thereabove is another and similar box-like supporting frame member 52. A shaft 54 fixed to spacer member 50 or to center section 20 of the trailer, or to both thereof, extends upwardly into frame member 52 and defines the vertical pivot axis about which the moveable portion of the ride rotates. Frame member 52 is rotatably supported on the spacer member 50 as by antifriction bearing means 55 so as to be freely rotatable about the axis of stationary shaft 54.

Both of members 50 and 52 are provided with apertured lugs 56 through which bolts 57 can be passed to clamp the two members together against rotation for transporting of the ride. When the ride is erected and ready for use, the bolts are withdrawn from the apertured lugs 56 so that the ride can rotate on its support. It will be noted that lugs 56 align when the ride is in its FIGURE 3, or transport position.

Fixedly mounted on frame member 52 is a transversely extending beam means 58 in the form of a tube. This beam means is fixed to frame member 52 so as to form a part of the frame and is thus rotatable about the axis of shaft 54 with member 52. Rotatably mounted on beam 58 at each side of member 52 is a drive sprocket 60. The sprockets 60 pivotally support the inner ends of the arms which carry the seats of the amusement ride.

As will be seen in FIGURE 14 bracket means 62 are provided which are fixed to the sprockets 60 and which brackets have pivot means 64 receiving the inner ends of the inner parts 66 of the arms previously referred to. As will be seen in FIGURES 1 and 2 there is a plurality of such arms associated with each of the sprockets 60. Eight arms are shown for each sprocket but there could be more or fewer of the arms as might be desired. Ten arms for each wheel is a desirable number. Each arm comprises the aforementioned inner portion 66 and an outer portion 68. The arms are of about equal length and are jointed together by bracket arrangement 70 shown in FIGURE 5. Bracket 70 is fixed to the outer end of inner arm part 66 as by bolt means 67 and, preferably, also by welding, if so desired. Each bracket has pivot means 72 that pivotally engages bracket means 74 on the inner end of the pertaining outer arm portion 68. Each arm portion 68, in turn, has a hole therethrough that registers with holes provided in bracket 70 through which a retaining pin or bolt 76 can be passed. By removing pin or bolt 76, arm portion 68 can be folded back on its pertaining arm portion 66 and, conversely, when arm portion 68 is folded out so as to be in alignment with pertaining arm portion 66, bolt or pin 76 can be employed for locking the arm 68 in its outer position.

When arm 68 is folded back on its pertaining arm 66, a clip 80 on one thereof registers with a hole in the other thereof and pin means 82 can be provided to pass through the holes thereby to fix the arms together in their folded back position.

Each of the aforementioned brackets 70 has a pair of short arm members 84 projecting toward the underside of the respective arm which have pivot means 86 that pivotally engages the upper end of a brace bar 88 that projects from the pertaining arm toward the center of rotation of the wheel which the arm forms a part. This will be observed in FIGURES 1 and 2 where it will be seen that the inner ends of the brace arms 88 pivotally engage a ring member 90.

The ring members 90 are slidable on the axial direction of the aforementioned tubular member 58. When the members 90 are in the position in which they are illustrated in FIGURES 1 and 2 the seat supporting arms, made of the portions 66 and 68 are in their outermost position. When, however, members 90 are moved inwardly toward their pertaining sprockets 60, the seat supporting arms are drawn inwardly toward the axis of rotation of the wheels and which axis is also the central axis of tubular member 58. The arms collapsed inwardly, as above described, and with the outer portions folded back upon the inner portions are illustrated in FIGURE 3.

Power means could be employed for moving the members 90 inwardly and outwardly along tubular member 58 or this can be effected manually. When members 90 are in their outer positions they are, of course, fixedly secured in place by any suitable fastening means.

The aforementioned bracket 70 is also availed of for anchoring the opposite ends of a cable and turnbuckle arrangement shown in FIGURE 6. In FIGURE 6, it will be seen that there is a cable 92 fastened to an eye 94 secured to one of the brackets 70 whereas the adjacent bracket 70 has an eye 96 to which one end of a turnbuckle 98 is secured, the other end of the turnbuckle being fastened to cable 92. The cables with the turnbuckles therein are provided so that when members 90 are moved to the outermost position, all slack and lost motion in the joints of the device are taken up and the arms are firmly supported in their extended positions.

The outer ends of each of the outer portions 68 of the arms has a pivot post 100 thereon as shown in FIGURE 10 which extends horizontally when the respective arm is in its outer position. Each pivot post 100 has a bearing member 102 rotatably mounted thereon which carries a pivot pin 104 extending at right angles to the length of pivot post 100. Pivot pin 104 is adapted for engaging the lugs 106 fixed to the underneath side of the upper end of a curved car supporting member 108.

The car supporting member and its relation to the car is illustrated in FIGURE 8. Car supporting member 108 at its lower end has a beam like projection 110 and resting on this beam-like projection is a car 112 which may be, for example, glass fiber reinforced plastic. Beam member 110 advantageously extends along a recess formed on the underneath side of the car and which recess may be formed on its top surface, as at 114, so as to provide seating space for passengers in the car. It will be seen that the cars can swing in the fore and aft direction about pivot post 100 and can also swing in the lateral direction about pivot pin 104.

Other brace means may, of course, be provided extending between the outer parts 68 of the car supporting arms but no such brace means are illustrated in the drawings.

Turning now to the drive for the ride, this is illustrated in FIGURES 11 through 14. In these figures it will be noted that in the frame structure supported on frame member 52 is a drive motor 120 having an output shaft 122 which drives through an electric clutch 124 into a pulley over which belts 126 pass. Energization and de-energization of clutch 124 will selectively effect and interrupt driving connections between shaft 122 and belts 126.

Figure 11:
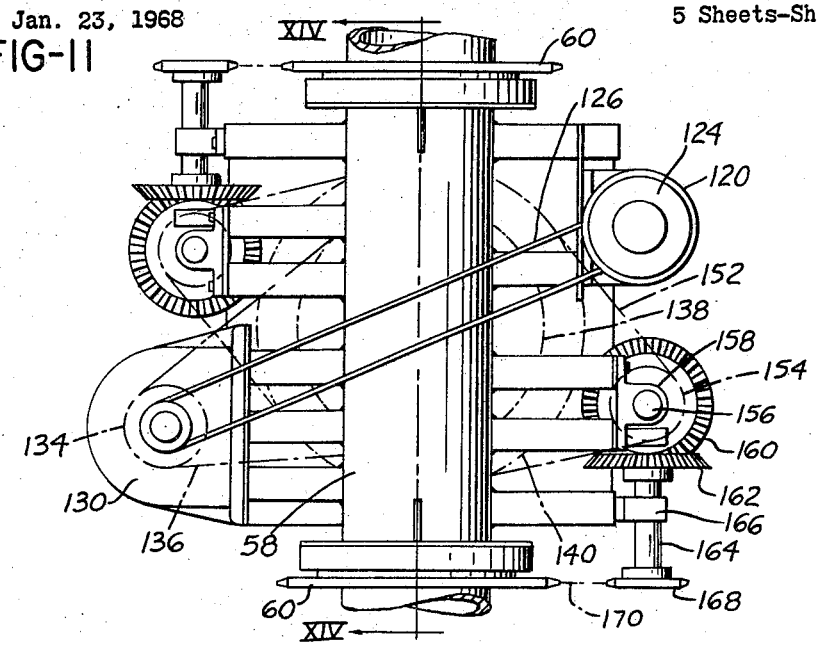
FIGURE 11 is a plan view of the drive arrangement for the ride.
Figure 12:
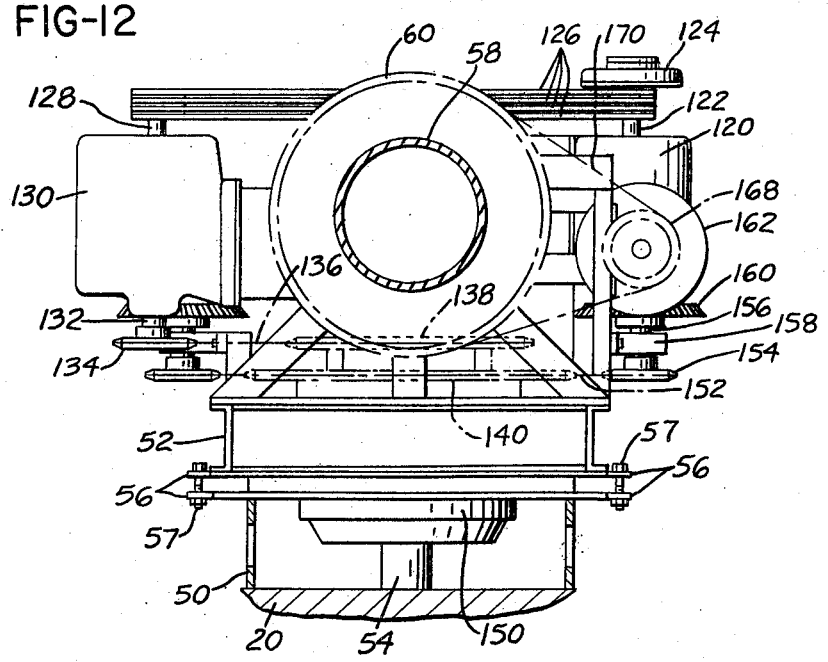
FIGURE 12 is a view looking in at FIGURE 11 from the bottom.

Belts 126, as will be seen in FIGURES 11 and 12, pass about a pulley mounted on input shaft 128 of a speed reducing mechanism 130. The speed reducing mechanism has an output shaft 132 on which is mounted a sprocket 134. Sprocket 134 is connected by a chain 136 with a sprocket wheel which is rotatably mounted on the upper end of stationary shaft 54. Sprocket 138 is fixedly connected to another somewhat larger sprocket 140 which is rotatably supported on member 52 as by the antifriction bearing 142.

A brake 144, such as an air operated brake, is disposed between shaft 54 and sprocket 140 and is adapted, when energized, to lock sprocket 140 against rotation by fixedly connecting it to the non-rotatable shaft 54.

A further brake, which may also be an air operated brake, is indicated at 150 and is adapted selectively to connect support member 52 to stationary shaft 54. It will be seen that when brake 150 is energized, support member 52 will be non-rotatable but, if brake 144 is at this time not energized, the sprockets 138, 140 can rotate.

The aforementioned larger sprocket 140, as will be seen in FIGURES 11, 12 and 13, has a chain 152 entrained thereabout which is also entrained about small sprockets 154 mounted on shafts 156 that are rotatable in bearings 158 carried on opposite sides of the frame structure. Shafts 156 have mounted thereon beveled gears 160 which mesh with pertaining bevel gears 162 which are, in turn, carried on shafts 164 rotatable in bearings 166 also carried on the frame structure. The last mentioned shafts 164 carry sprockets 168 which are connected by chains 170 with the aforementioned sprockets 60 which drive the cone shaped wheels of the ride in rotation.

At this point it will be seen that when brake 150 is energized to prevent rotation of support member 52 and the frame structure mounted thereon, the wheels of the ride can be caused to rotate on their axes if brake 144 is energized, the sprockets 138 and 140 are fixed to shaft 54 so that they will not rotate so that operation of the drive motor, when electric clutch 124 is energized, will cause the ride to rotate about the axis of shaft 54 due to the rotation of sprocket 134 while sprocket 138 is held against rotation. Also, due to the rotation of sprockets 154 about stationary sprocket 140, the wheels will also be driven in rotation about their common axis. In practice, the ride rotates on the vertical axis at about 6.3 revolutions per minute while simultaneously the wheels rotate on their common axis in respectively opposite directions at a speed of about 7.2 revolutions per minute.

When the lower brake 150 is applied and the upper brake 144 is released, the wheels will rotate about 5.9 revolutions per minute which is a good speed for the loading operation. The wheels can be stopped with the cars to be loaded or unloaded in the proper position by de-energizing electric clutch 124 and energizing top brake 144.

As mentioned, the wheels may have any desired number of support arms and while only eight arms are shown, it is contemplated to have ten arms on each wheel and each wheel having a car on each arm thereof. The cars will be of a size to hold two adults or three children and this would represent a maximum capacity of about 450 pounds. The weight of each car and the attachments thereof is estimated to be about 150 pounds. Each car supporting arm is about 18 ft. long and is estimated to weigh about 250 pounds. The maximum diameter of each wheel measured at the outer tips of the arms thereof is about 27 feet and the distance from the vertical center of rotation of the ride laterally outwardly to the plane of the outer ends of the arms is about 16 feet on each side of center. The center tubular beam forming the backbone of the rod is about 20 feet long and will weigh about 2,000 pounds.

The weight of the other portions of the device, and not including those parts above referred to, is estimated to represent about 1000 pounds concentrated on each end of the aforementioned beam.

It will be understood that this invention is susceptible to modification in order to adapt it to different usages and conditions, and, accordingly, it is desired to comprehend such modifications within this invention as may fall within the scope of the appended claims.

What is claimed is:

1. In an amusement ride; a frame, a base supporting said frame for rotation on a vertical axis, a transverse beam fixed to said frame and having end parts projecting therefrom in opposite directions, a drive sprocket rotatably mounted on each projecting end part, a ring-like support rotatable and slidable on each end part of the beam arms pivotally mounted at one end to a said sprocket and supported by mounting means on each said ring-like support and adapted to be collapsed against the beam or to be positioned so as to extend angularly outwardly therefrom when said ring-like support is slidably positioned, said arms when extending outwardly from said beam defining a pair of cone shaped wheels with their apices facing each other, each arm having means for suspending a car from its outer end when so extended, actuating means carried by the frame for causing said frame to rotate on said base on said vertical axis with simultaneous rotation of said wheels on the axis of said beam or to cause said wheels to rotate while said frame does not rotate, a jointed support beneath said base comprising end sections and a center section pivoted to the end sections, said base being mounted on said center section, said sections in lowered position forming an elongated substantially flat support for the ride, and means for pivoting the end sections downwardly about the pivotal connection thereof with said center section to form a generally A shaped support with said center section at the top supporting said base and the frame thereon in an elevated position and with the outer ends of said end sections in position to engage a supporting surface such as the earth.

2. An amusement ride according to claim 1 which includes means for laterally bracing said support when elevated and means for fixing said end sections in their downwardly pivoted positions to form a stable structure.

3. An amusement ride according to claim 2 in which one of said end sections has support wheels thereon so the support serves as a trailer for transporting the ride when the support is in lowered position.

4. An amusement ride according to claim 1 in which each arm comprises an inner part and an outer part and a bracket pivotally interconnecting the parts of each arm so the parts can be folded back on each other, said mounting means including a bar for each arm pivoted at one end to the respective said bracket and at the other end to the respective said ring-like support, said bars being of such length that when said ring is disposed adjacent the pertaining said sprocket the said arms will be drawn into substantial parallelism with said beam and when said ring-like support is moved outwardly along the respective end part of the beam the said arms will be moved to their outer positions.

5. An amusement ride according to claim 4 which includes flexible tension elements connected between each adjacent pair of said brackets.

6. An amusement ride according to claim 1 in which said means for suspending a car from the outer end of each arm comprises a pivot post fixed to the outer end of each arm and extending horizontally outwardly when the respective arm is in its outer position, a bearing member rotatable on each said pivot post and pivot means on each bearing member extending at right angles to the said pivot post and adapted for engagement with a car support member.

7. An amusement ride according to claim 1 in which said actuating means comprises a shaft stationary with said base and extending upwardly into said frame, sprocket means rotatable on said shaft, first brake means between the sprocket means and shaft selectively energizable to lock the sprocket means to the shaft, a drive motor on the frame and chain means driven by the motor and engaging said sprocket means so said frame will rotate when said first brake means is energized, drive means connecting said sprocket means with said drive sprockets to rotate said ring-like supports and the said wheels made up of said arms when said sprocket means and frame rotate relatively, and second brake means between said frame and base selectively energizable for locking said frame to the base.

8. An amusement ride according to claim 7 in which said sprocket means comprises a first sprocket of one size connected to said motor and a second sprocket of another size drivingly connected to said drive sprockets and fixed to said first sprocket.

References Cited
UNITED STATES PATENTS

| | | | |
|---|---|---|---|
| 852,248 | 4/1907 | Watson | 272—36 |
| 2,559,768 | 7/1951 | Howard | 272—36 |
| 3,176,983 | 4/1965 | Barber | 272—29 |

ANTON O. OECHSLE, Primary Examiner

ARNOLD W. KRAMER, Assistant Examiner

U.S. Cl. X.R.

272—36; 280—106